United States Patent
Beard et al.

(10) Patent No.: US 12,462,656 B2
(45) Date of Patent: Nov. 4, 2025

(54) VIBRATION-BASED LOCATION INDICATION SYSTEM

(71) Applicant: Dell Products L.P., Round Rock, TX (US)

(72) Inventors: Neal Beard, Austin, TX (US); Bruce Anthony Holmes, Austin, TX (US); Maunish Shah, Austin, TX (US); Douglas Roy Kaiser, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 128 days.

(21) Appl. No.: 18/461,051

(22) Filed: Sep. 5, 2023

(65) Prior Publication Data

US 2025/0078634 A1    Mar. 6, 2025

(51) Int. Cl.
  *G08B 21/00*    (2006.01)
  *G08B 6/00*    (2006.01)
(52) U.S. Cl.
  CPC ...................... *G08B 6/00* (2013.01)
(58) Field of Classification Search
  CPC . G08B 6/00; H04R 3/00; H04R 1/025; H04R 17/00; G06F 13/122
  See application file for complete search history.

(56) References Cited

U.S. PATENT DOCUMENTS

| | | | | |
|---|---|---|---|---|
| 5,969,256 | A * | 10/1999 | Hobbs | G01M 7/06 73/662 |
| 8,867,819 | B2 * | 10/2014 | Calio | G06V 20/10 382/153 |
| 9,720,479 | B2 * | 8/2017 | Kunnathur Ragupathi | G06F 1/3203 |
| 11,665,474 | B1 * | 5/2023 | Narayanan | H04R 17/00 381/386 |
| 2022/0020248 | A1 * | 1/2022 | Crisp | H05B 47/115 |

* cited by examiner

*Primary Examiner* — Toan N Pham
(74) *Attorney, Agent, or Firm* — Joseph Mencher

(57) ABSTRACT

A vibration-based location indication system includes a computing system that is coupled to a management system via a network. The computing system includes a computing system vibration device, and a computing system location indication subsystem that is coupled to the network and the computing system vibration device. The computing system location indication subsystem receives a computing system location indication instruction to indicate a location of the computing system from the management system via the network and, based on the computing system location indication instruction, drives the computing system vibration device to produce a vibration that is configured to indicate the location of the computing system.

20 Claims, 14 Drawing Sheets

VIBRATION-BASED LOCATION INDICATION SYSTEM

BACKGROUND

The present disclosure relates generally to information handling systems, and more particularly to using vibrations to indicate the location of information handling systems and/or information handling system components.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handlings systems such as, for example, server devices, switch devices, storage systems, and/or other computing devices known in the art sometimes must sometimes be located in order to, for example, service and/or replace those computing devices and/or their computing component that are experiencing issues. As will be appreciated by one of skill in the art in possession of the present disclosure, the locating of such computing devices is difficult due to those computing devices often being located amongst many other computing devices (e.g., in racks in a datacenter). Conventional solutions to such issues include providing a Light Emitting Device (LED) on the computing device and causing that LED to "blink" when that computing device must be located, which allows a datacenter technician to locate that computing device by visually identifying the blinking LED. However, such visual indications of the location of computing devices raise several issues.

For example, blind and/or otherwise visually impaired datacenter technicians cannot identify the blinking LEDs discussed above, and thus conventional solutions prevent or limit the ability of people with visual impairments from performing the computing device servicing or replacement described above. Furthermore, even when a datacenter technician does not have a visual impairment that prevents them from identifying the blinking LEDs described above, those blinking LEDs can be obscured by other computing devices, racks, cabling, and/or other datacenter components, or may simply not be in the line-of-sight of the datacenter technician, requiring the datacenter technician to search for the blinking LED in order to locate the computing device they are attempting to service or replace. Further still, even when the blinking LEDs discussed above are not obscured and are in the line-of-sight of the datacenter technician, there are often many LEDs in a datacenter that may be blinking for reasons other than providing a visual indication the location of their computing device, which can result in the datacenter technician identifying an incorrect computing device for servicing or replacement.

Accordingly, it would be desirable to provide a computing device location indication system that addresses the issues discussed above.

SUMMARY

According to one embodiment, an Information Handling System (IHS) includes a chassis; at least one vibration device that is housed in the chassis; a processing system that is housed in the chassis and that is coupled to the at least one vibration device; and a memory system that is housed in the chassis, that is coupled to the processing system, and that includes instructions that, when executed by the processing system, cause the processing system to provide a location indication engine that is configured to: receive a location indication instruction to indicate a location; and drive, based on the location indication instruction, the at least one vibration device to produce a vibration that is configured to indicate the location.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
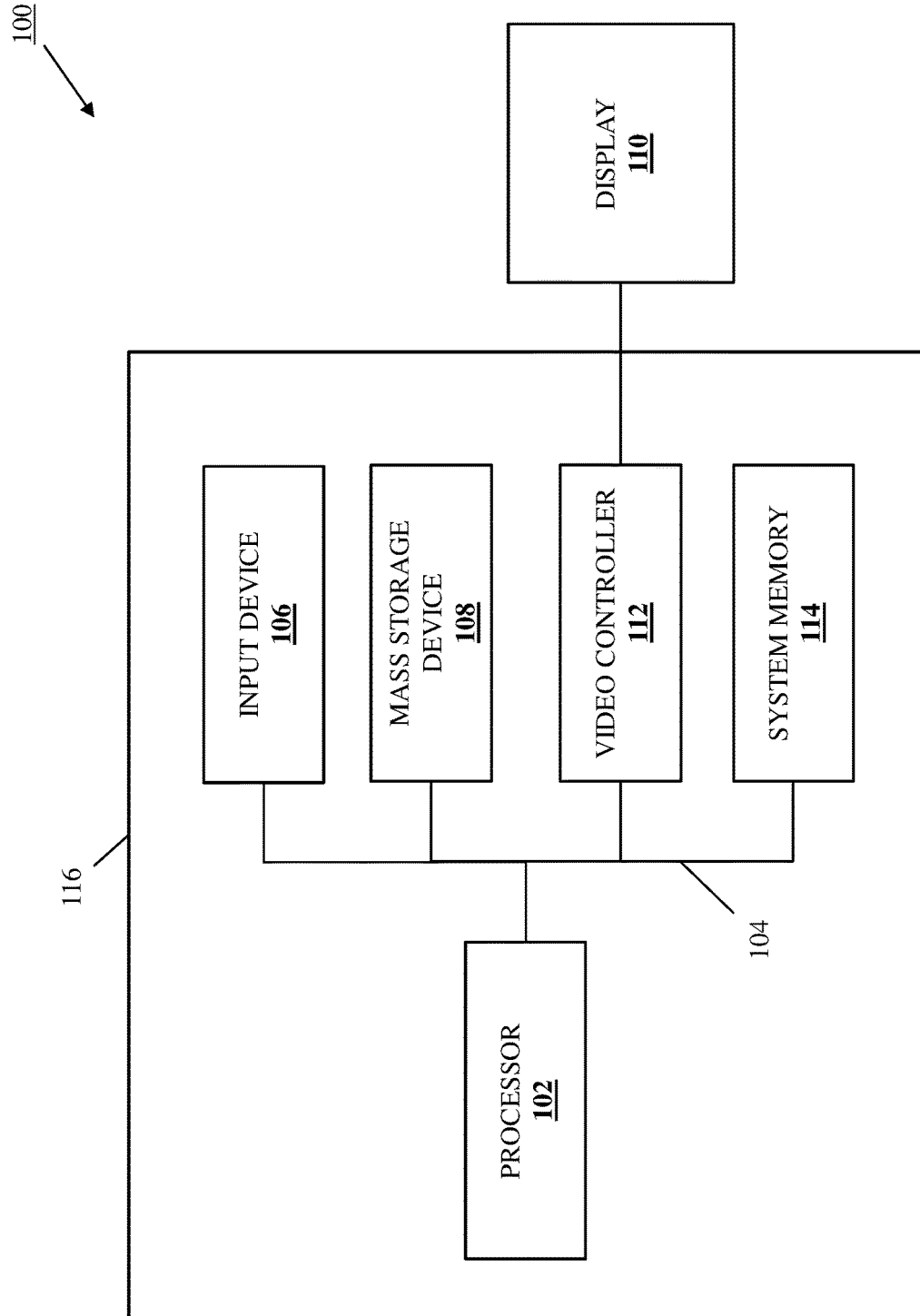
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
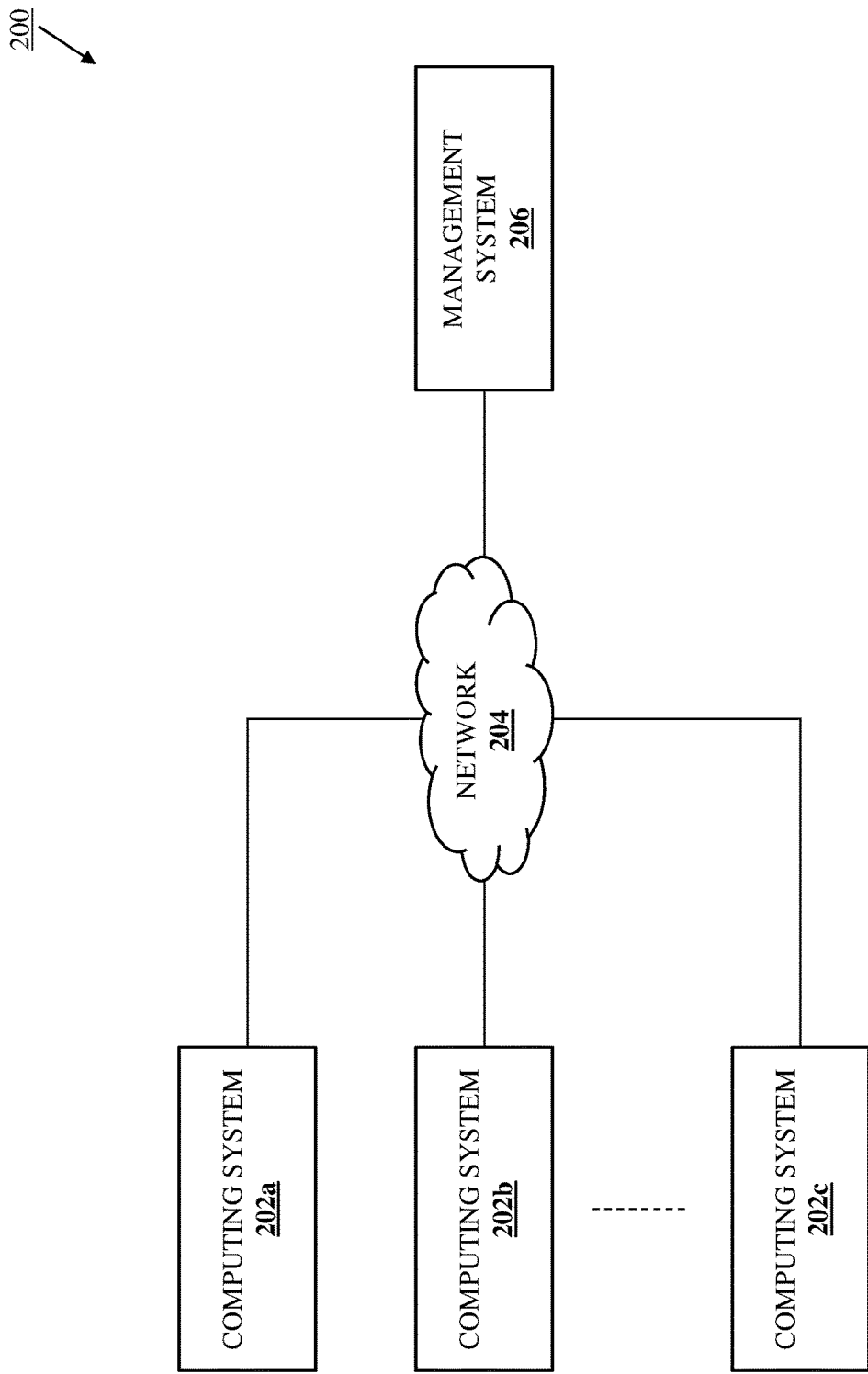
FIG. 2 is a schematic view illustrating an embodiment of a networked system that may provide the vibration-based location indication system of the present disclosure.

Referring now to FIG. 2, an embodiment of a networked system 200 is illustrated that may provide the vibration-based location indication system of the present disclosure. In a specific example, the networked system 200 may be provided by a datacenter, although one of skill in the art in possession of the present disclosure will appreciate how the network system 200 may be provided in a variety of other implementations while remaining within the scope of the present disclosure as well. In the illustrated embodiment, the networked system 200 includes a plurality of computing systems 202a, 202b, and up to 202c. In an embodiment, any or each of the computing systems 202a-202c may be provided by the IHS 100 discussed above with reference to FIG. 1, and/or may include some or all of the components of the IHS 100, and in specific examples may be provided by server devices, switch devices, storage systems, and/or other datacenter computing systems that would be apparent to one of skill in the art in possession of the present disclosure. However, while illustrated and discussed as being provided by particular datacenter computing systems, one of skill in the art in possession of the present disclosure will recognize that computing systems provided in the networked system 200 may include any computing systems that may be configured to operate similarly as the computing systems 202a-202c discussed below.

As illustrated, in some embodiments each of the computing systems 202a-202c may be coupled to a management system 206 via a network 204 that may be provided by a Local Area Network (LAN), the Internet, combinations thereof, and/or any other networks that would be apparent to one of skill in the art in possession of the present disclosure. In an embodiment, the management system 206 may be provided by the IHS 100 discussed above with reference to FIG. 1, and/or may include some or all of the components of the IHS 100, and in specific examples may be provided by a desktop computing device, a laptop/notebook computing device, a tablet computing device, a mobile phone, one or more server devices, and/or any other management system components that would be apparent to one of skill in the art in possession of the present disclosure.

However, while illustrated and discussed as being provided by particular management systems, one of skill in the art in possession of the present disclosure will recognize that management systems provided in the networked system 200 may include any management systems that may be configured to operate similarly as the management system 206 discussed below. Furthermore, while a specific networked system 200 has been illustrated and described, one of skill in the art in possession of the present disclosure will recognize that the networked system of the present disclosure may include a variety of components and component configurations for providing conventional networked system functionality, as well as the vibration-based location indication functionality discussed below, while remaining within the scope of the present disclosure as well.

Figure 3:
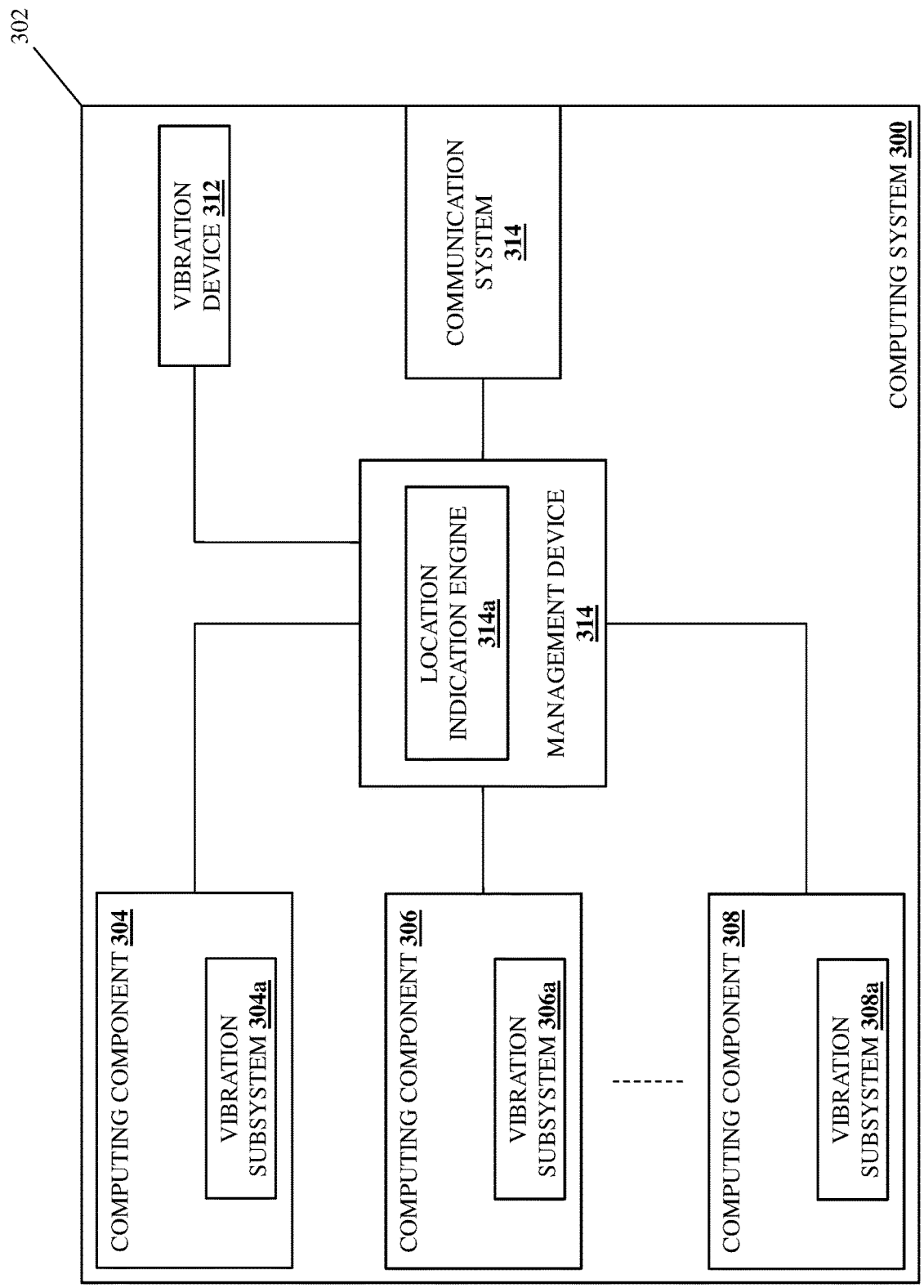
FIG. 3 is a schematic view illustrating an embodiment of a computing system that may provide the vibration-based location indication system of the present disclosure.

Referring now to FIG. 3, an embodiment of a computing system 300 is illustrated that may provide the vibration-based location indication system of the present disclosure, and/or may provide any or all of the computing systems 202a-202c in the networked system 200 discussed above with reference to FIG. 2. As such, the computing system 300 may be provided by the IHS 100 discussed above with reference to FIG. 1 and/or may include some or all of the components of the IHS 100, and in specific examples may be provided by server devices, switch devices, storage systems, and/or other datacenter computing systems that would be apparent to one of skill in the art in possession of the present disclosure. However, while illustrated and discussed as being provided by a datacenter computing system, one of skill in the art in possession of the present disclosure will recognize that the computing system 300 may be provided by any computing systems that may be configured to operate similarly as the computing system 300 discussed below.

In the illustrated embodiment, the computing system 300 includes a chassis 302 that houses the components of the computing system 300, only some of which are illustrated and discussed below. For example, in the illustrated embodiment, the chassis 302 houses a plurality of computing components 304, 306, and up to 308. In an embodiment, any or all of the computing components 304-308 may be provided by components of the IHS 100 discussed above with reference to FIG. 1, and in the specific examples below are described as being provided by storage devices, Power Supply Units (PSU) devices, fan systems, other Field Replaceable Unit (FRU) devices, and/or any other computing component that would be apparent to one of skill in the art in possession of the present disclosure.

As illustrated in FIG. 3, each of the computing components 304, 306, and up to 308 may include a respective vibration subsystem 304a, 306a, and up to 308a. As described in further detail below, in some embodiments each of the vibration subsystems 304a-308a may include a dedicated vibration device that may be provided by any of a variety of vibration motors that one of skill in the art in possession of the present disclosure would recognize as providing the vibration-based location indication functionality described below. However, as also described in further detail below, in other embodiments the vibration device in each of the vibration subsystems 304a-308a in the respective computing components 304-308 may be provided by at least one computing component subsystem in that computing component that is configured to operate to provide at least one computing component function that is unrelated to vibration-based location indication functionality described, and that is configured to produce vibrations in response to operating. For example, such a computing component subsystem may be provided by a hard disk in a Hard Disk Drive (HDD) storage device that may vibrate in response to spinning to allow data to be read from the hard disk, a fan in a fan system that may vibrate in response to rotating to produce an airflow, and/or any other vibration-producing computing system component that one of skill in the art in possession of the present disclosure would recognize as providing the vibrations as part of their operations as described below.

In the illustrated embodiment, the chassis 302 also houses a management device 314 that is coupled to each of the computing components 304-308. In an embodiment, the management device 314 may be provided by the IHS 100 discussed above with reference to FIG. 1 and/or may include some or all of the components of the IHS 100, and in specific examples may be provided by a Baseboard Management Controller (BMC) device such as the integrated DELL® Remote Access Controller (iDRAC) device available in server devices provided by DELL®, Inc. of Round Rock, Texas, United States, as well as any other management devices that would be apparent to one of skill in the art in possession of the present disclosure. As such, the management device 314 may provide an Out-Of-Band (OOB) management platform on the computing system 300 that includes resources that are mostly separate from the resources of the computing system 300, and that may provide a browser-based and/or Command Line Interface (CLI) for managing and monitoring of hardware and/or software in the computing system 300, as well as performing any of the functionality described below. However, while illustrated and discussed as being provided by a particular management device, one of skill in the art in possession of the present disclosure will recognize that the management device 314 may be provided by any management device that may be configured to operate similarly as the management device 314 discussed below.

In the embodiments illustrated and described below, the management device 314 may include a management processing system (not illustrated, but which may be similar to the processor 102 discussed above with reference to FIG. 1) and a management memory system (not illustrated, but which may be similar to the memory 114 discussed above with reference to FIG. 1) that is coupled to the management processing system and that includes instructions that, when executed by the management processing system, cause the management processing system to provide a location indication engine 314a that is configured to perform the functionality of the location indication engines, location indication subsystems, and/or computing systems discussed below. As will be appreciated by one of skill in the art in possession of the present disclosure, the location indication engine 304 may be coupled to each of the computing devices 304-308 via, for example, a coupling between the management processing system and the computing components 304-308.

The chassis 302 may also house a vibration device 312 that is coupled to the location indication engine 314a in the management device 314 (e.g., via a coupling between the management processing system and the vibration device 312). In some embodiments, the vibration device 312 may include a dedicated vibration device that may be provided by any of a variety of vibration motors that one of skill in the art in possession of the present disclosure would recognize as providing the vibration-based location indication functionality described below. However, in other embodiments, the vibration device 312 may be provided by at least one computing system subsystem in the computing system 300 that is configured to operate to provide at least one computing system function that is unrelated to vibration-based location indication functionality described, and that is configured to produce vibrations in response to operating. As such, similarly as described above, the computing system subsystem that provides the vibration device 312 may include a hard disk in an HDD storage device that may vibrate in response to spinning to allow data to be read from the hard disk, a fan in a fan system that may vibrate in response to rotating to produce an airflow, and/or any other vibration-producing computing system subsystem that one of skill in the art in possession of the present disclosure would recognize as providing the vibrations as part of their operations as described below.

The chassis 302 may also house a communication system 314 that is coupled to the location indication engine 314a (e.g., via a coupling between the communication system 308 and the management processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing system 300 has been illustrated and described, one of skill in the art in possession of the present disclosure will recognize that computing systems may include a variety of components and/or component configurations for providing conventional computing system functionality, as well as the vibration-based location indication functionality discussed below, while remaining within the scope of the present disclosure as well.

Figure 4:
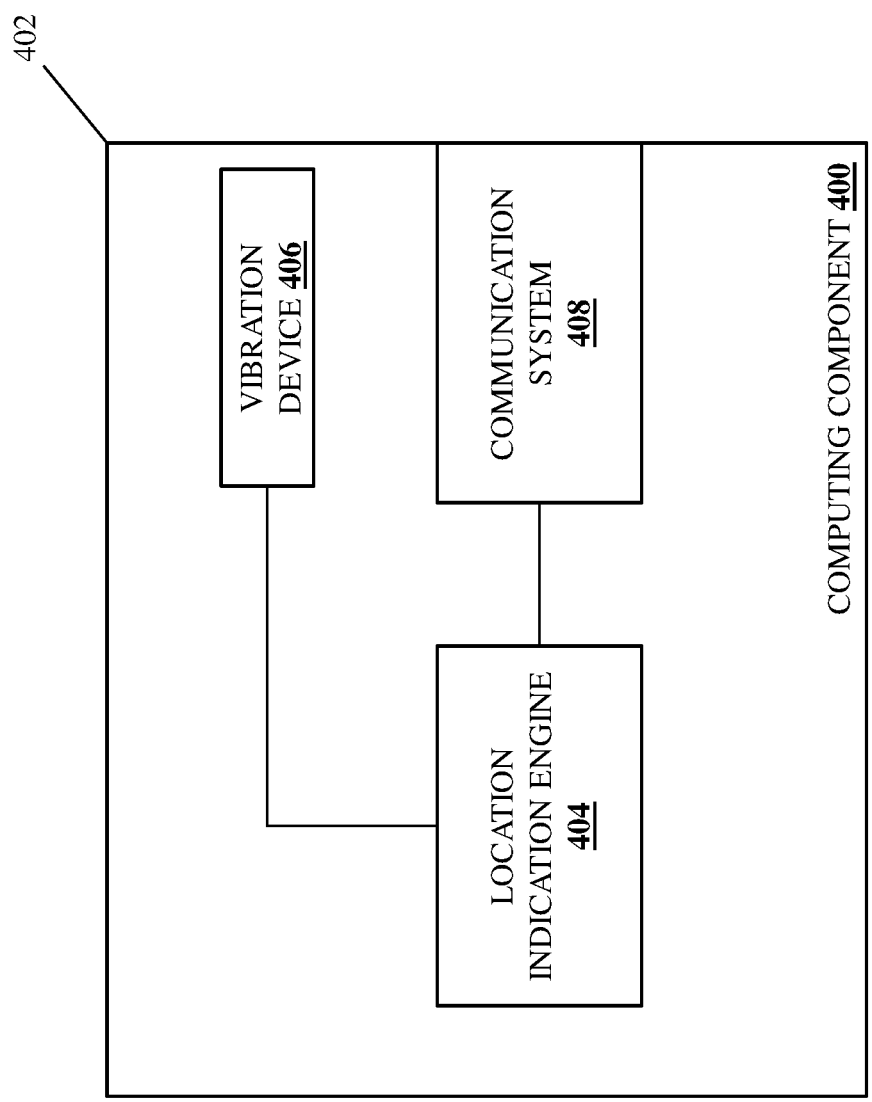
FIG. 4 is a schematic view illustrating an embodiment of a computing component that may provide the vibration-based location indication system of the present disclosure.

Referring now to FIG. 4, an embodiment of a computing component 400 is illustrated that may provide the vibration-based location indication system of the present disclosure, and/or may provide any or all of the computing components 304-308 discussed above with reference to FIG. 3. As such, the computing component 400 may provide a component in the IHS 100 discussed above with reference to FIG. 1, and in specific examples may be provided by storage devices, Power Supply Units (PSU) devices, fan systems, other Field Replaceable Unit (FRU) devices, and/or any other computing component that would be apparent to one of skill in the art in possession of the present disclosure. However, while illustrated and discussed as being provided by particular computing components, one of skill in the art in possession of the present disclosure will recognize that the computing component 400 may be provided by any computing components that may be configured to operate similarly as the computing component 400 discussed below.

In the illustrated embodiment, the computing component 400 includes a chassis 402 that houses the components of the computing component 400, only some of which are illustrated and discussed below. For example, in the illustrated embodiment, the chassis 402 may house a component processing system (not illustrated, but which may be similar to the processor 102 discussed above with reference to FIG. 1 and may be provided by a component controller, component microcontroller, and/or other component processor that would be apparent to one of skill in the art in possession of the present disclosure) and a component memory system (not illustrated, but which may be similar to the memory 114 discussed above with reference to FIG. 1 and may be provided by a component controller, component microcontroller, and/or other component memory that would be apparent to one of skill in the art in possession of the present disclosure) that is coupled to the component processing system and that includes instructions that, when executed by the component processing system, cause the component processing system to provide a location indication engine 404 that is configured to perform the functionality of the location indication engines, location indication subsystems, and/or computing components discussed below.

The chassis 402 may also house a vibration device 406 that is coupled to the location indication engine 404 (e.g., via a coupling between the component processing system and the vibration device 406). In some embodiments, the vibration device 406 may include a dedicated vibration device that may be provided by any of a variety of vibration motors that one of skill in the art in possession of the present disclosure would recognize as providing the vibration-based location indication functionality described below. However, in other embodiments, the vibration device 406 may be provided by at least one computing component subsystem in the computing component 400 that is configured to operate to provide at least one computing component function that is unrelated to vibration-based location indication functionality described, and that is configured to produce vibrations in response to operating. As such, similarly as described above, a computing component subsystem that provides the vibration device 406 may include a hard disk in an HDD storage device that may vibrate in response to spinning to allow data to be read from the hard disk, a fan in a fan system that may vibrate in response to rotating to produce an airflow, and/or any other vibration-producing computing component subsystem that one of skill in the art in possession of the present disclosure would recognize as providing the vibrations as part of their operations as described below.

The chassis 402 may also house a communication system 408 that is coupled to the location indication engine 404 (e.g., via a coupling between the communication system 308 and the component processing system) and that may be provided by any computing component communication devices that would be apparent to one of skill in the art in possession of the present disclosure. However, while a specific computing component 400 has been illustrated and described, one of skill in the art in possession of the present disclosure will recognize that computing components may include a variety of component subsystems and/or component subsystem configurations for providing conventional computing component functionality, as well as the vibration-based location indication functionality discussed below, while remaining within the scope of the present disclosure as well.

Figure 5:
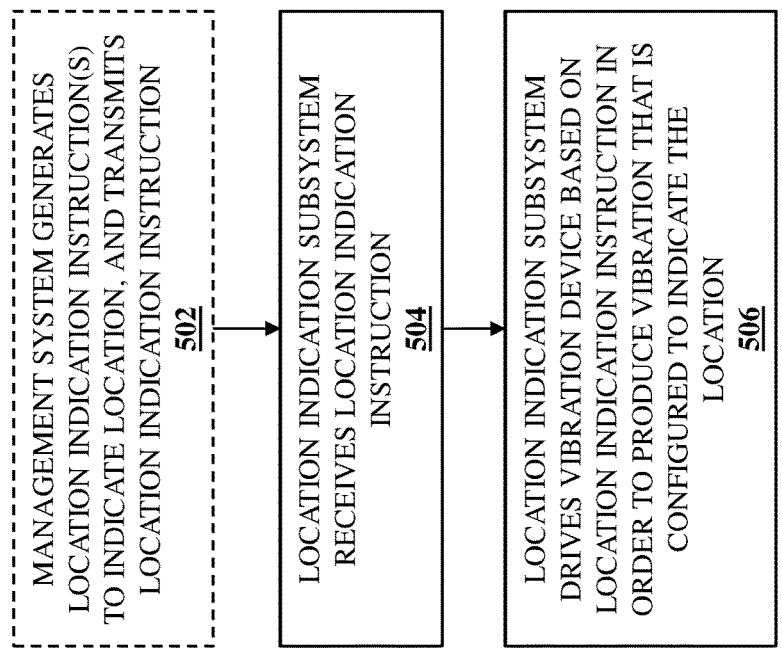
FIG. 5 is a flow chart illustrating an embodiment of a method for indicating a location of a computing system or computing component using vibrations.

Referring now to FIG. 5, an embodiment of a method 500 for indicating a location of a computing system or computing device using vibrations is illustrated. As discussed below, the systems and methods of the present disclosure provide for the indication of a location of a computing system or a computing component by vibrating a vibration device included in that computing system or that computing component. For example, the vibration-based location indication system of the present disclosure may include a computing system that is coupled to a management system via a network. The computing system includes a computing system vibration device, and a computing system location indication subsystem that is coupled to the network and the computing system vibration device. The computing system location indication subsystem receives a computing system location indication instruction to indicate a location of the computing system from the management system via the network and, based on the computing system location indication instruction, drives the computing system vibration device to produce a vibration that is configured to indicate the location of the computing system. As such, the issues with conventional visual location indications discussed above are remedied, allowing blind or visually impaired datacenter technicians to locate computing systems and computing components in datacenters, and assisting datacenter technicians with no visual impairments in locating computing systems and computing components in datacenters as well.

Figure 6:
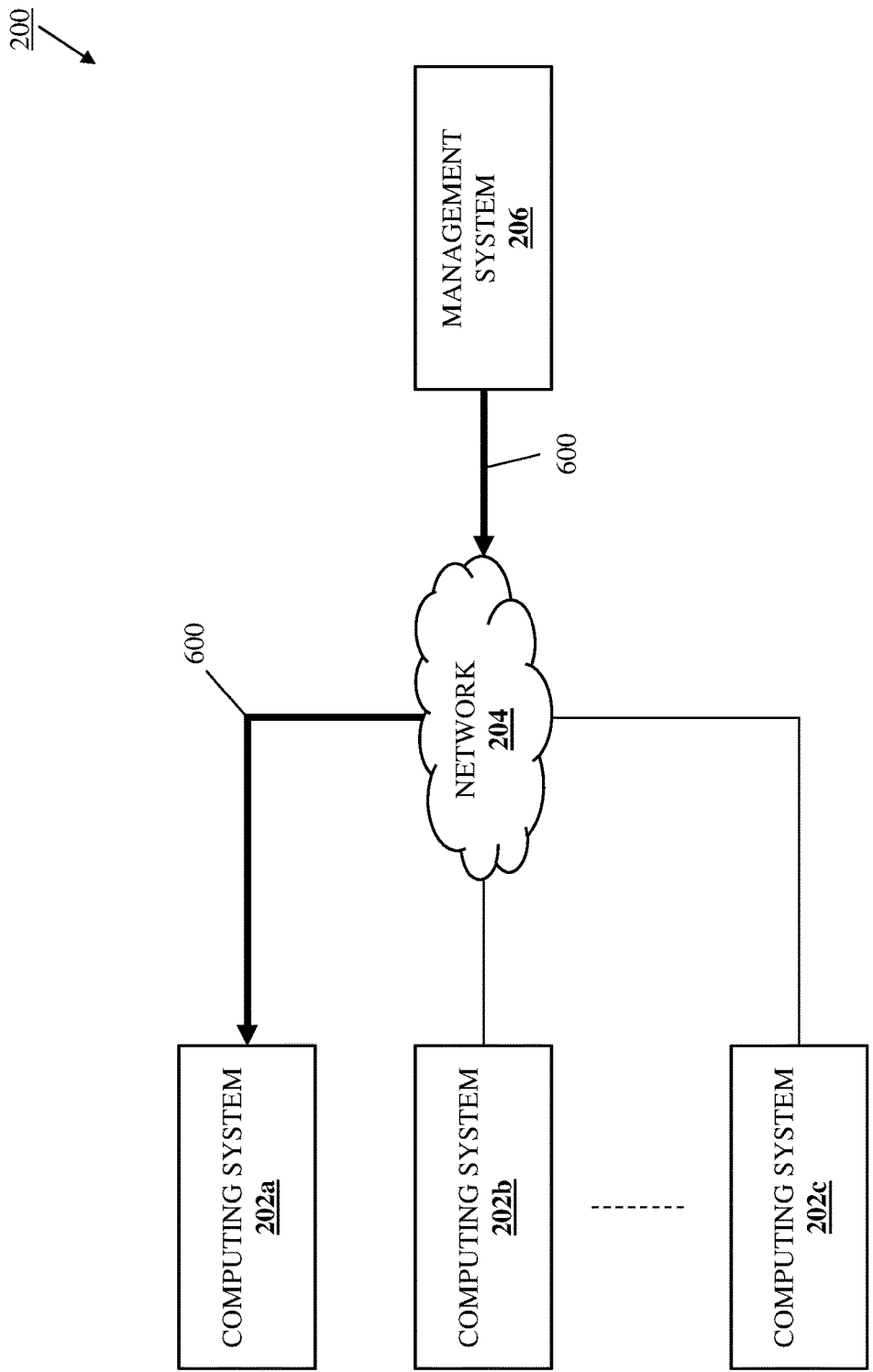
FIG. 6 is a schematic view illustrating an embodiment of the networked system of FIG. 2 operating during the method of FIG. 5.

The method 500 may begin at optional block 502 where a management system generates at least one location indication instruction to indicate a location, and transmits the location indication instruction. In the specific embodiment of block 502 illustrated in FIG. 6 and in many of the examples provided below, the management system 206 may perform location indication instruction provisioning operations 600 that may include generating at least one location indication instruction, and transmitting the location indication instruction(s) to via the network 204 to the computing system 202a. However, while the location indication instruction is illustrated and described in many of the examples below as being provided to the computing system 202a, one of skill in the art in possession of the present disclosure will appreciate how location indication instructions may be provided to any of the computing systems 202b-202c in a similar manner while remaining within the scope of the present disclosure as well.

To provide a specific example, the management system 206 may be configured to operate (e.g., with the management device 314 in any of the computing systems 202a-202c/300) to provide a management user interface that is provided for display to a network administrator or other user of the management system 206, and that allows the network administrator or other user to generate and transmit the location indication instruction(s) to the computing systems 202a-202c/300 and/or their computing component(s) 304-308 to indicate their respective location. For example, the management user interface may allow the network administrator or other user to select any of the computing systems 202a-202c/300 and/or their computing components 304-308, and then apply a "tactile" location indication instruction to the selected computing systems/computing components that, as discussed below, will cause the vibration device(s) in those computing systems and/or computing components to vibrate in order to indicate their location. Furthermore, the management user interface may also allow the user to select and apply a "visual" indication instruction to the selected computing systems/computing components that one of skill in the art in possession of the present disclosure will appreciate may cause Light Emitting Device(s) (LED(s)) in those computing systems and/or computing components (not illustrated or discussed below) to illuminate in order to indicate their location, as well as to apply a combined "tactile/vibration" indication instruction to the selected computing systems/computing components that will cause vibration device(s) and LED(s) in those computing systems and/or computing components to vibrate/illuminate in order to indicate their location.

However, while a specific example of the generation of location indication instructions via a management system has been described, one of skill in the art in possession of the present disclosure will appreciate how the location indication instructions provided according to the teachings of the present disclosure may be generated in a variety of manners and using a variety of techniques that will fall within the scope of the present disclosure as well. For example, and as discussed below, in some embodiments optional block 502 may be skipped and the location indication instructions provided according to the teachings of the present disclosure may be generated by the computing systems and/or computing components of the present disclosure while remaining within the scope of the present disclosure as well.

Figure 7:
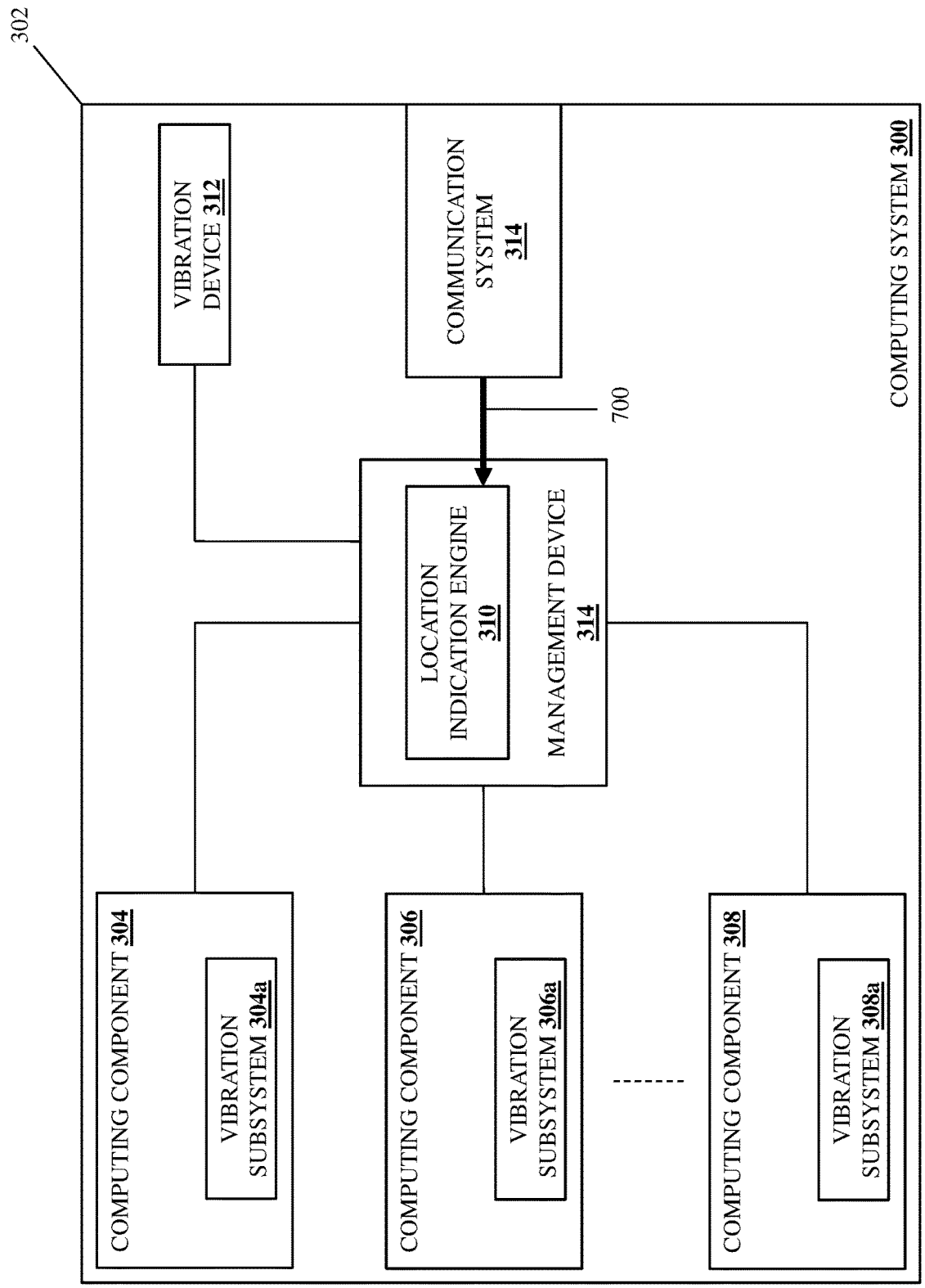
FIG. 7 is a schematic view illustrating an embodiment of the computing system of FIG. 3 operating during the method of FIG. 5.

The method 500 then proceeds to block 504 where a location indication subsystem receives the location indication instruction. With reference to FIG. 7, in some embodiments of block 504, the location indication engine 310 in the management device 314 included in the computing system 202a/300 may perform location indication instruction receiving operations 700 that include receiving the location indication instruction, which was generated and transmitted by the management system 206 at optional block 502, via its communication system 314.

Figure 8A:
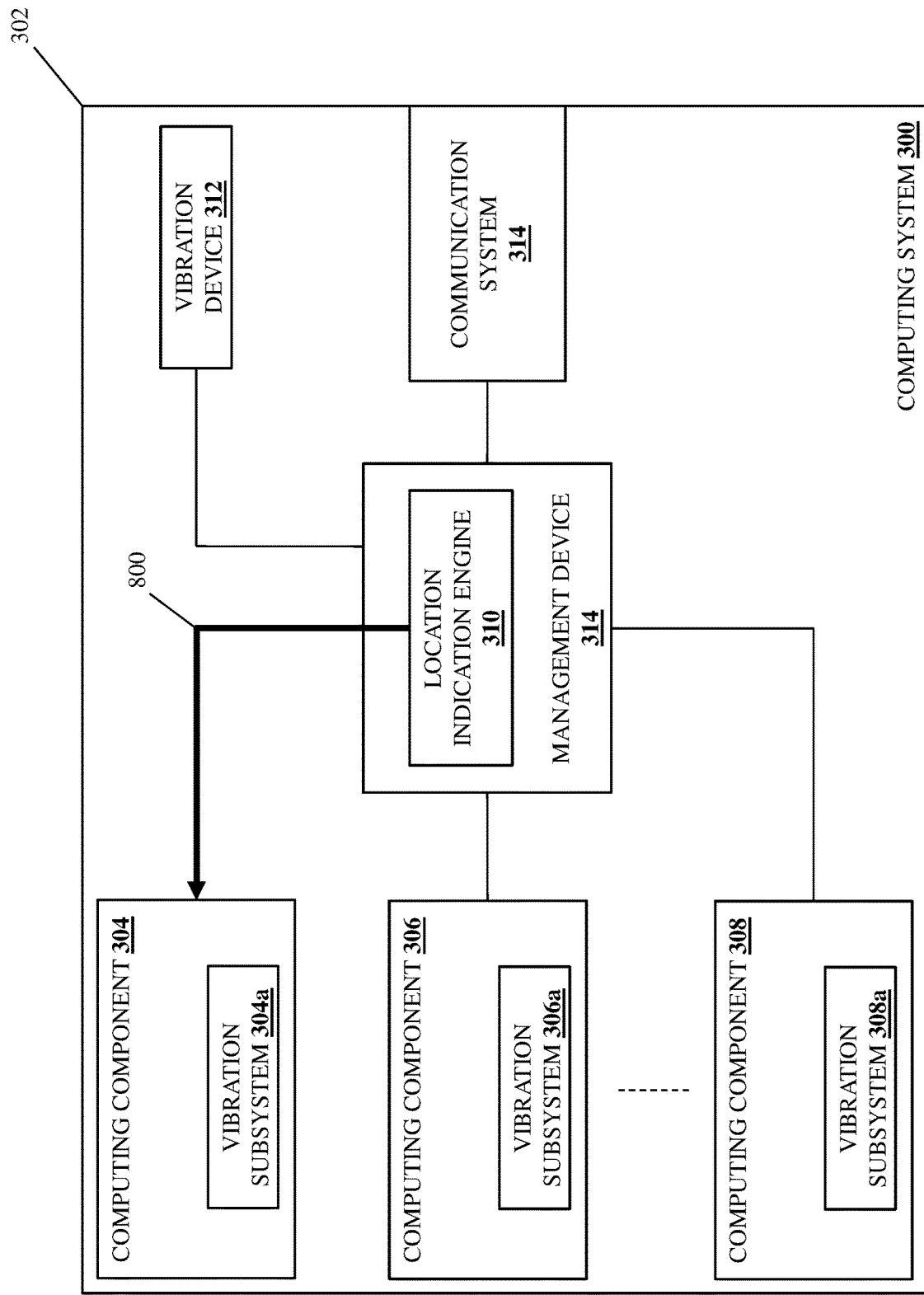
FIG. 8A is a schematic view illustrating an embodiment of the computing system of FIG. 3 operating during the method of FIG. 5.
Figure 8B:
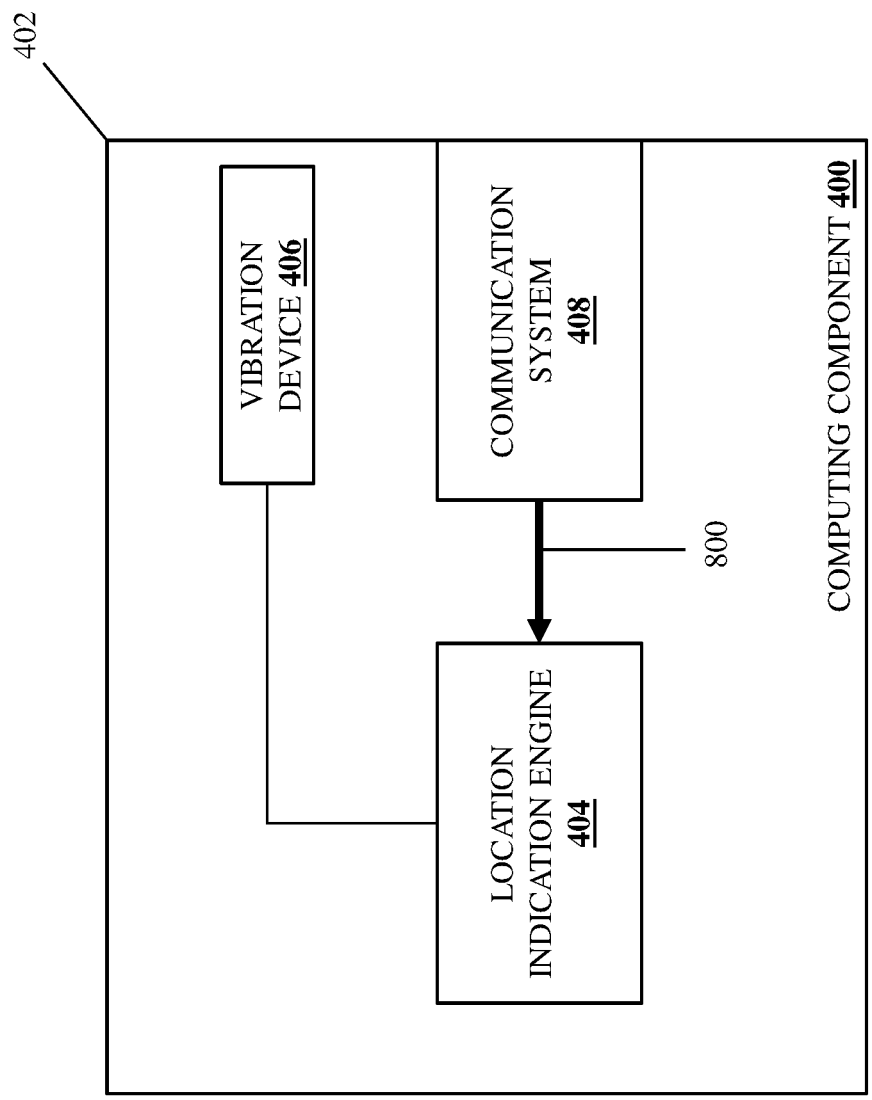
FIG. 8B is a schematic view illustrating an embodiment of the computing component of FIG. 4 operating during the method of FIG. 5.

With reference to FIGS. 8A and 8B, in some embodiments of block 504, the location indication engine 310 in the management device 314 included in the computing systems 202a/300 may perform location indication instruction forwarding operations 800 that include forwarding the location indication instruction, which was received from the management system 206, to the location indication engine 404 in the computing component 304/400 via its communication system 408. For example, FIGS. 7, 8A and 8B may illustrate an embodiment in which the location indication instruction is a computing component location indication instruction from the management system 206 that instructs the indication of a location of the computing component 304. However, while the computing component location indication instruction is illustrated and described as being provided to the computing component 304, one of skill in the art in possession of the present disclosure will appreciate how computing component location indication instructions may be provided to any of the computing components 304-308 in a similar manner while remaining within the scope of the present disclosure as well.

Furthermore, as discussed above, in some embodiments optional block 502 may be skipped, and the location indication instructions provided according to the teachings of the present disclosure may be generated by the management device 314 included in the computing system 202a/300. For example, in such embodiments, the management device 314 (e.g., a monitoring engine included therein) may be configured to monitor a health status, operating status, lifecycle status, and/or other characteristics of the computing system 202a/300 or its computing components 304-308 and, in response to detecting any issues (e.g., failures, imminent failures, faults, operation anomalies, lifecycle dates, etc.), may generate the location indication instruction that is "received" by the location indication engine 310 in the management device 314 at block 504. For example, such embodiments may include the management device 314 in the computing system 202a/300 generating a computing system location indication instruction that is configured to indicate the location of the computing system 202a/300 in response to detecting an issue with the computing system 202a/300 and/or one of its computing components 304-308.

However, one of skill in the art in possession of the present disclosure will also appreciate how the management device 314 in the computing system 202a/300 may generate a computing component location indication instruction that is configured to indicate the location of the computing component 304 in the computing system 202a/300 in response to detecting an issue with that computing component 304, and then may transmit that computing component location indication instruction to the location indication engine 404 in the computing component 304/400 similarly as illustrated and described above with reference to FIGS. 8A and 8B.

Further still, in embodiments in which optional block 502 is skipped, the location indication instructions provided according to the teachings of the present disclosure may be generated by the location indication engine 404 in the computing component 304/400 included in the computing system 202a/300. For example, in such embodiments, the location indication engine 404 in the computing component 304/400 (or a monitoring engine connected thereto) may be configured to monitor the health status, operating status, lifecycle status, and/or other characteristics of the computing component 304 and/or its computing components subsystems and, in response to detecting any issues (e.g., failures, imminent failures, faults, operation anomalies, lifecycle dates, etc.), may generate the location indication instruction that is "received" by the location indication engine 404 in the computing component 304/400 at block 504. For example, such embodiments may include the location indication engine 404 in the computing component 304/400 of the computing system 202a/300 generating a computing component location indication instruction that is configured to indicate the location of the computing component 304/400 in response to detecting an issue with that computing component 304/400.

Figure 9A:
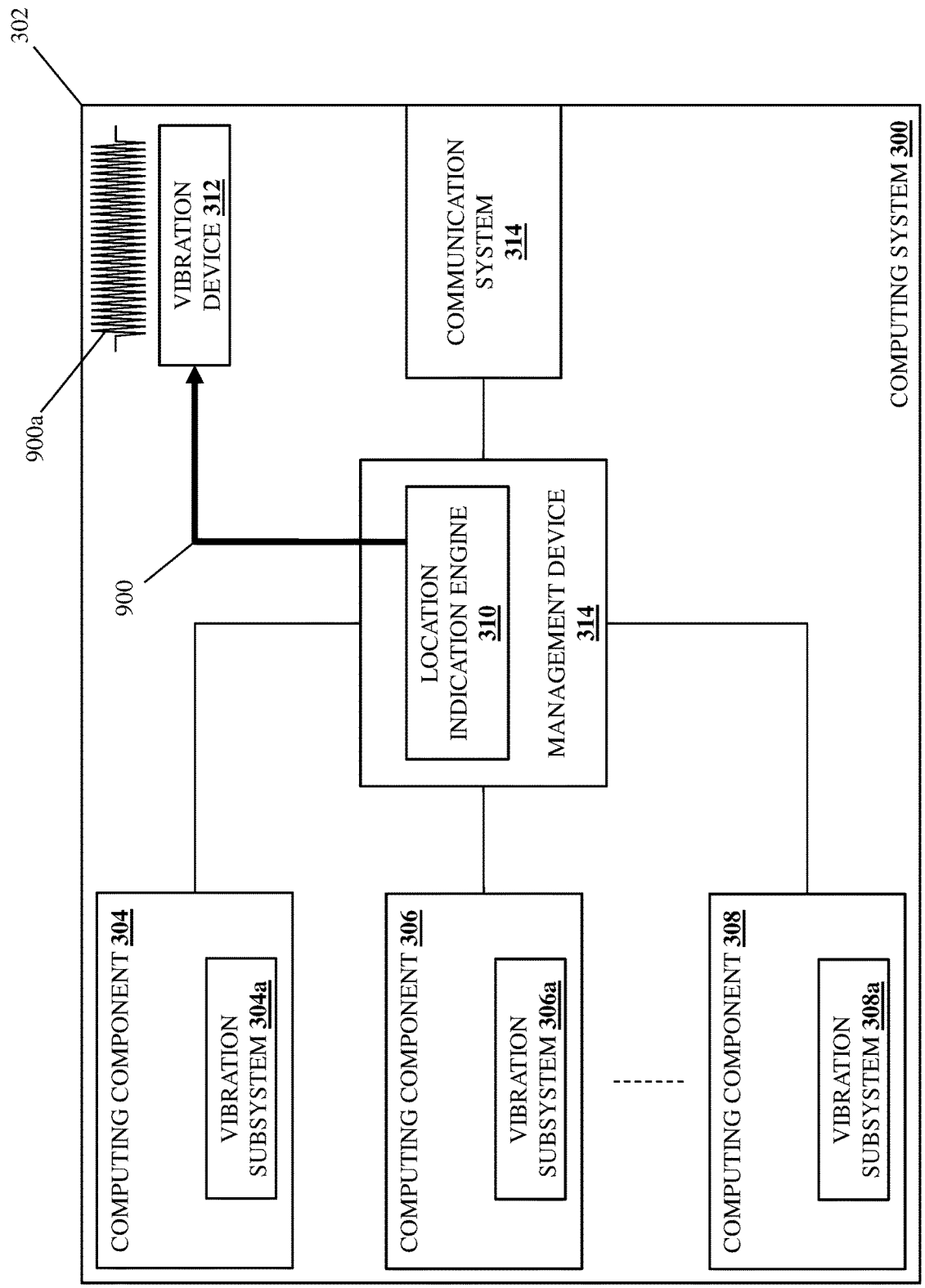
FIG. 9A is a schematic view illustrating an embodiment of the computing system of FIG. 3 operating during the method of FIG. 5.

The method 500 then proceeds to block 506 where the location indication subsystem drives a vibration device based on the location indication instruction in order to produce a vibration that is configured to indicate a location. With reference to FIG. 9A, in an embodiment of block 506, the location indication engine 310 in the management device 314 of the computing system 202a/300 may perform vibration-based location indication operations 900 that include driving the vibration device 312 to produce a vibration 900a based on the location indication instruction received at block 504. In a specific example in which the location indication instruction is a computing system location indication instruction (received from the management system 206 or generated by the management device 314) that instructs the indication of a location of the computing system 300, the vibration-based location indication operations 900 may be performed by the location indication engine 310 to drive the vibration device 312 to produce the vibration 900a that, in the illustrated example, includes a relatively long vibration period that is configured to indicate the location of the computing system 300.

To provide a specific example, the vibration-based location indication operations 900 may be configured to indicate the location of the computing system 202a/300 using vibration-based morse code that provides a vibration morse code "dash" for the computing system 202a/300, an example of which is illustrated by the vibration 900a in FIG. 9A. As such, a datacenter technician looking for the computing system 202a/300 in a datacenter may feel and listen for the vibration morse code "dash" in order to locate that computing device 202a/300. Furthermore, in embodiments in which computing systems may have their locations indicated by vibration morse code "dashes", the location of different computing systems may be indicated by different numbers of vibration morse code "dashes" (e.g., one vibration morse code "dash" for a first computing system whose location is required, two vibration morse code "dashes" for a second computing system whose location is required, and so on). However, while a specific example of the use of particular vibrations to indicate the location of computing systems has been illustrated and described, one of skill in the art in possession of the present disclosure will appreciate how vibrations (e.g., relatively more intense vibrations vs relatively less intense vibrations, combinations of vibration morse code "dots" and "dashes", etc.) may be utilized in a variety of manners to indicate the location of computing systems while remaining within the scope of the present disclosure as well.

Figure 9B:
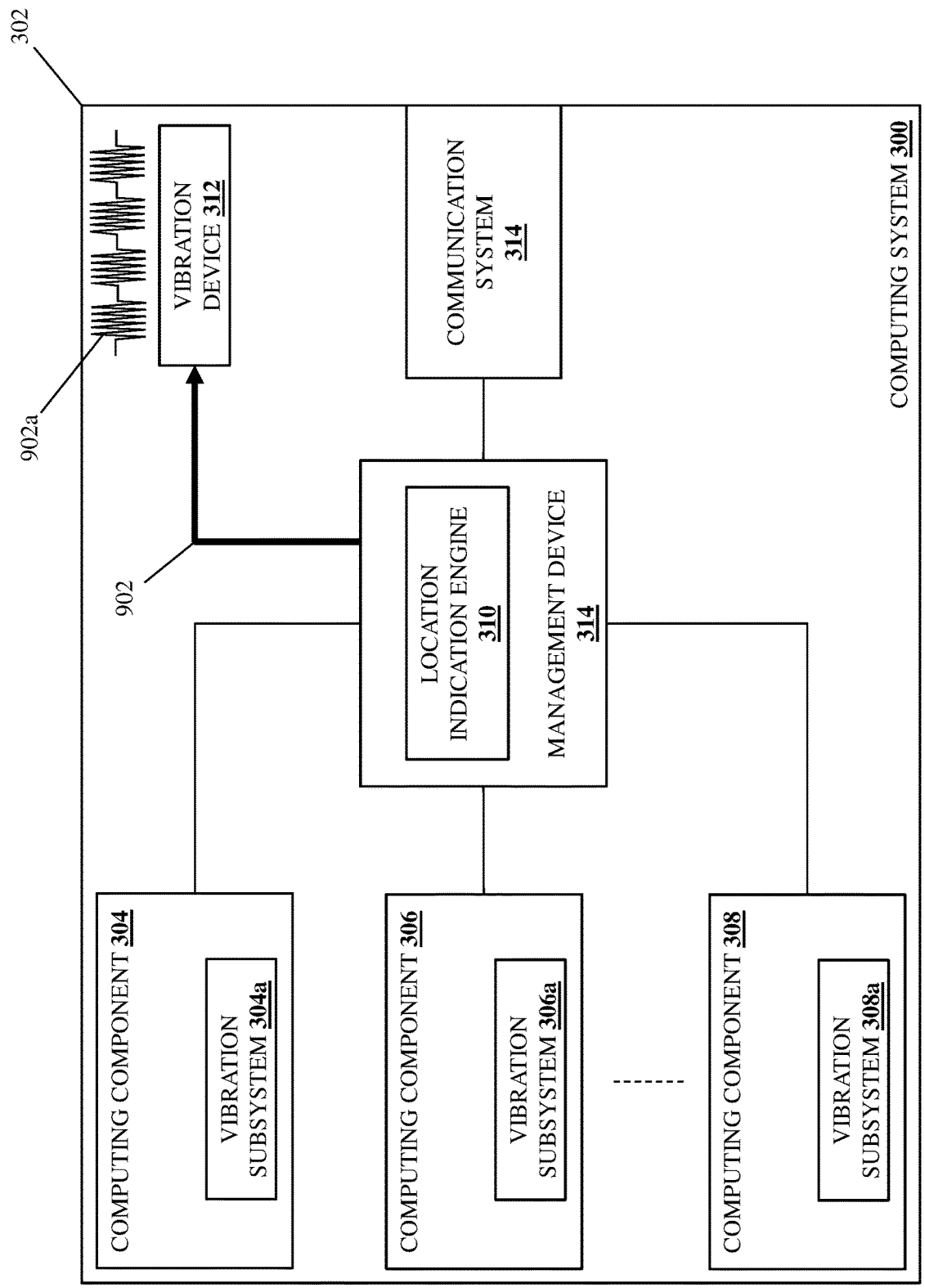
FIG. 9B is a schematic view illustrating an embodiment of the computing system of FIG. 3 operating during the method of FIG. 5.

With reference to FIG. 9B, in an embodiment of block 506, the location indication engine 310 in the management device 314 of the computing system 202a/300 may perform vibration-based location indication operations 902 that include driving the vibration device 312 to produce a vibration 902a based on the location indication instruction received at block 504. In a specific example in which the location indication instruction is a computing component location indication instruction (e.g., from the management system 206 or generated by the management device 314) that instructs the indication of a location of the computing component 304 in the computing system 300, the vibration-based location indication operations 902 may be performed by the location indication engine 310 to drive the vibration device 312 to produce the vibration 902a that, in the illustrated example, includes a plurality of short vibration periods that are configured to indicate the location of the computing component 304 in the computing system 300.

To provide a specific example, the vibration-based location indication operations 902 may be configured to indicate the location of the computing component 304 in the computing system 300 using vibration-based morse code that provides one or more vibration morse code "dots" for the computing component 304, an example of which is illustrated by the vibration 902a in FIG. 9A. As such, a datacenter technician looking for the computing component 304 in a datacenter may feel and listen for the vibration morse code "dot(s)" in order to locate the computing system 300 that includes that computing component 304. Furthermore, in embodiments in which computing components may have their locations indicated by vibration morse code "dots", the location of different computing components may be indicated by different numbers of vibration morse code "dots" (e.g., one vibration morse code "dot" for a first computing component whose location is required, two vibration morse code "dots" for a second computing component whose location is required, and so on). However, while a specific example of the use of particular vibrations to indicate the location of computing components has been illustrated and described, one of skill in the art in possession of the present disclosure will appreciate how vibrations (e.g., relatively more intense vibrations vs relatively less intense vibrations, combinations of vibration morse code "dots" and "dashes", etc.) may be utilized in a variety of manners to indicate the location of computing components while remaining within the scope of the present disclosure as well.

Figure 10A:
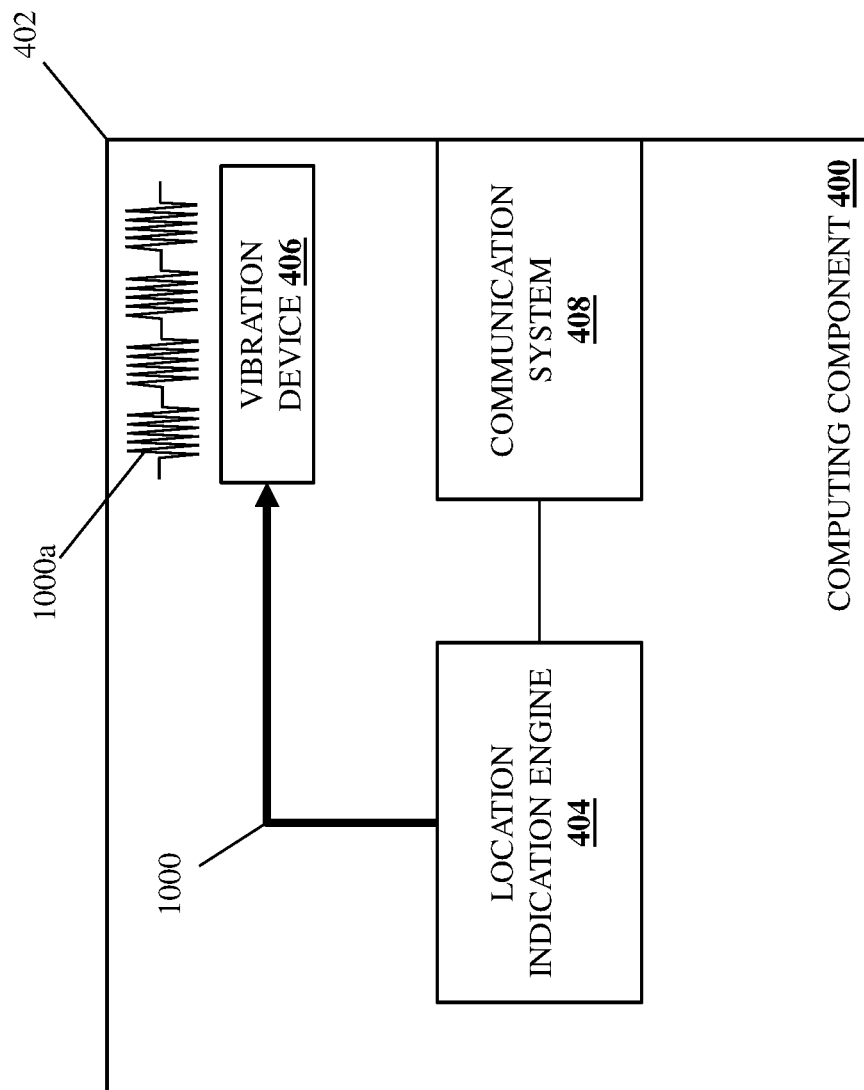
FIG. 10A is a schematic view illustrating an embodiment of the computing component of FIG. 4 operating during the method of FIG. 5.
Figure 10B:
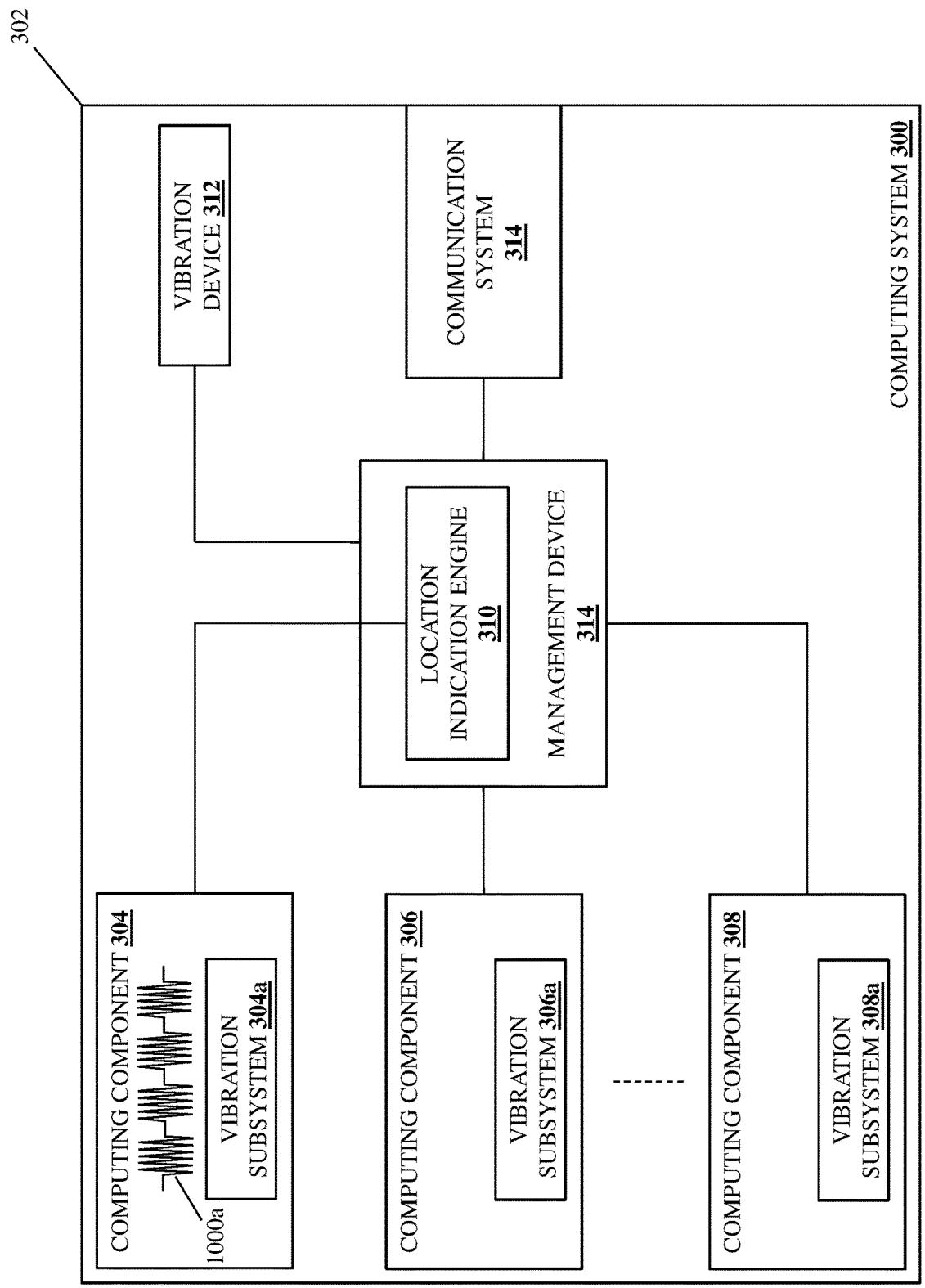
FIG. 10B is a schematic view illustrating an embodiment of the computing system of FIG. 3 operating during the method of FIG. 5.

With reference to FIGS. 10A and 10B, in an embodiment of block 506, the location indication engine 404 in the computing component 304/400 of the computing system 202a/300 may perform vibration-based location indication operations 1000 that include driving the vibration device 406 to produce a vibration 1000a based on the location indication instruction received at block 504. As discussed above, the location indication instruction may be a computing component location indication instruction (e.g., received from the management system 206 via the management device 314, generated by the management device 314, generated by the location indication engine 404) that instructs the indication of a location of the computing component 304/400, and the vibration-based location indication operations 1000 may be performed by the location indication engine 404 to drive the vibration device 406 to produce the vibration 1000a that, in the illustrated example, includes a plurality of short vibration periods that are configured to indicate the location of the computing component 304.

Figure 11:
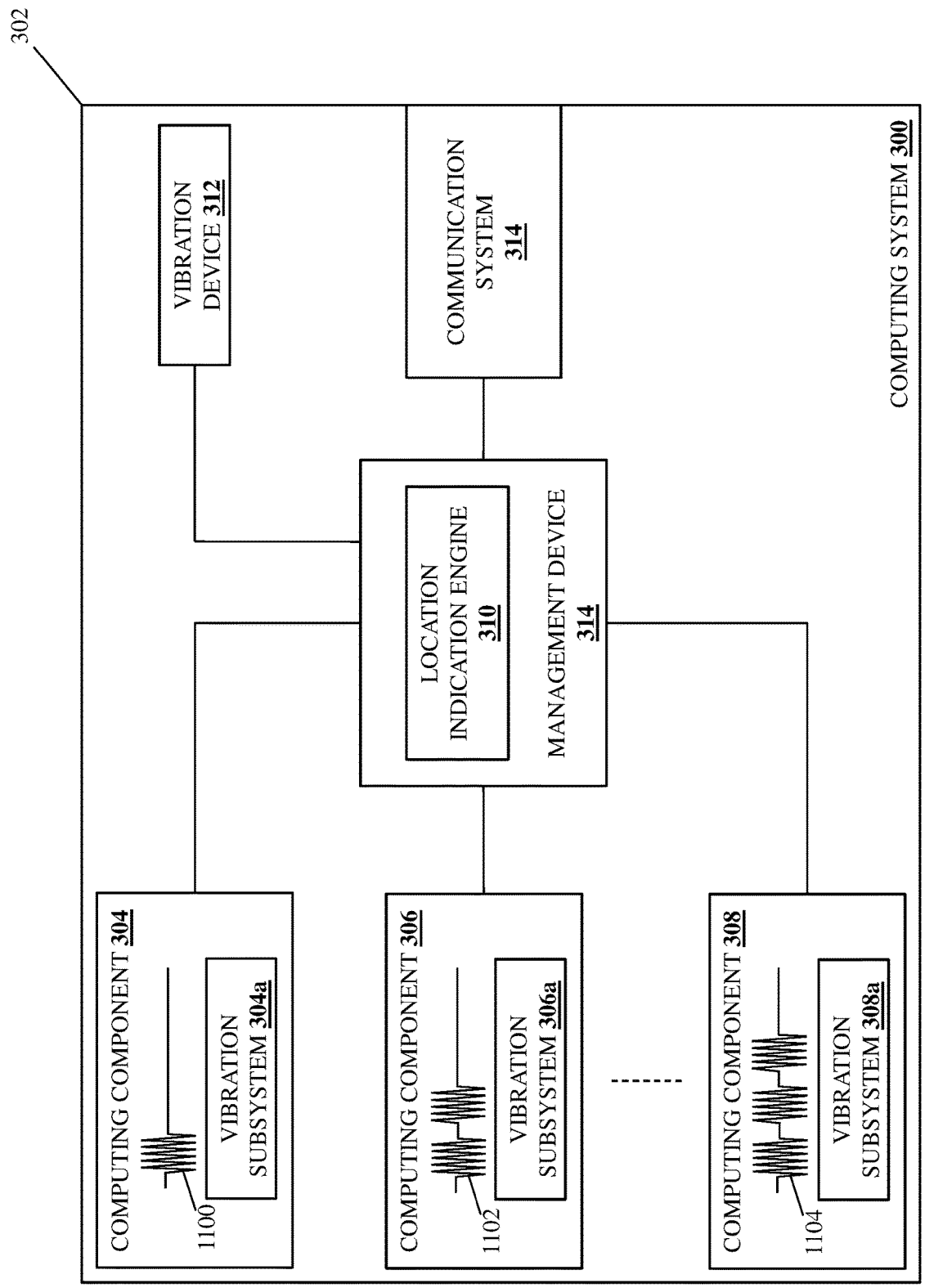
FIG. 11 is a schematic view illustrating an embodiment of the computing system of FIG. 3 operating during the method of FIG. 5.

Similarly as described above, the vibration-based location indication operations 1000 may be configured to indicate the location of the computing component 304/400 using vibration-based morse code that provides one or more vibration morse code "dots" for the computing component 304/400, an example of which is illustrated by the vibration 1000a in FIGS. 10A and 10B. As such, a datacenter technician looking for the computing component 304/400 in a datacenter may feel and listen for the vibration morse code "dot(s)" in order to locate that computing component 304/400. Furthermore, FIG. 11 illustrates an embodiment in which different computing components may have their locations indicated by different numbers of vibration morse code "dots" (e.g., one vibration morse code "dot" 1100 for computing component 304 whose location is required, two vibration morse code "dots" for the computing component 306 whose location is required, three vibration morse code "dots" for the computing component 308 whose location is required, and so on). However, while a specific example of the use of particular vibrations to indicate the location of computing components has been illustrated and described, one of skill in the art in possession of the present disclosure will appreciate how vibrations (e.g., relatively more intense vibrations vs relatively less intense vibrations, combinations of vibration morse code "dots" and "dashes", etc.) may be utilized in a variety of manners to indicate the location of computing components while remaining within the scope of the present disclosure as well.

As such, at block 506, a datacenter technician may utilize the vibrations (and/or sound produced via those vibrations) to locate the computing system(s) or computing component (s) they are attempting to service or replace. Furthermore, one of skill in the art in possession of the present disclosure will appreciate how the location indication instructions described herein may provide for the vibrations described above for a limited period of time or number of vibrations, and/or how the vibration-based location indication system may allow the datacenter technician to stop those vibrations once a computing system or computing component has been located (e.g., via a switch on the computing system or computing component, through the network 204 via the management system 206, etc.).

Thus, systems and methods have been described that provide for the indication of a location of a computing system or a computing component by vibrating a vibration device included in that computing system or that computing component. For example, the vibration-based location indication system of the present disclosure may include a computing system that is coupled to a management system via a network. The computing system includes a computing system vibration device, and a computing system location indication subsystem that is coupled to the network and the computing system vibration device. The computing system location indication subsystem receives a computing system location indication instruction to indicate a location of the computing system from the management system via the network and, based on the computing system location indication instruction, drives the computing system vibration device to produce a vibration that is configured to indicate the location of the computing system. As such, the issues with conventional visual location indications discussed above are remedied, allowing blind or visually impaired datacenter technicians to locate computing systems and computing components in datacenters, and assisting datacenter technicians with no visual impairments in locating computing systems and computing components in datacenters as well.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A vibration-based location indication system, comprising:
    a management system; and
    a computing system that is coupled to the management system via a network and that includes:
        a computing system chassis;
        a plurality of computing components that are housed in the computing system chassis and that each include a respective computing component vibration device; and
        at least one computing component location indication subsystem that is coupled to the network and each respective computing component vibration device, wherein the at least one computing component location indication subsystem is configured to:
            receive, from the management system via the network, a plurality of computing component location indication instructions to indicate a respective location of each of the plurality of computing components; and
            drive, based on the plurality of computing component location indication instructions, the respective computing component vibration device included in each of the plurality of computing components to produce a unique vibration pattern for that computing component that is configured to indicate the respective location of that computing component.

2. The system of claim 1, wherein the computing system includes:
    a computing system vibration device; and
    a computing system location indication subsystem that is coupled to the network and the computing system vibration device, wherein the computing system location indication subsystem is configured to:
        receive, from the management system via the network, a computing system location indication instruction to indicate a location of the computing system; and
        drive, based on the computing system location indication instruction, the computing system vibration device to produce a vibration that is configured to indicate the location of the computing system.

3. The system of claim 1, wherein the at least one computing component location indication subsystem includes a single computing component location indication subsystem that is housed in the computing system chassis and coupled to each of the plurality of computing components.

4. The system of claim 1, wherein the at least one computing component location indication subsystem includes a respective computing component location indication subsystem that is included in each of the plurality of computing components.

5. The system of claim 1, wherein unique vibration patterns each include a different number of vibration morse code dots.

6. The system of claim 1, wherein at least one of the computing component vibration devices is provided by at least one of the plurality of computing components in the computing system that is configured to operate to provide at least one computing component function that is unrelated to computing component location indication and that is configured to produce the vibration in response to operating.

7. An Information Handling System (IHS), comprising:
    a chassis;
    a plurality of components that are housed in the chassis that each include a respective component vibration device;
    a processing system that is housed in the chassis and that is coupled to each respective component vibration device; and
    a memory system that is housed in the chassis, that is coupled to the processing system, and that includes instructions that, when executed by the processing system, cause the processing system to provide at least one component location indication engine that is configured to:
        receive a plurality of component location indication instructions to indicate a respective location of each of the plurality of components; and
        drive, based on the plurality of component location indication instructions, the respective component vibration device included in each of the plurality of components to produce a unique vibration pattern for that component that is configured to indicate the respective location of that component.

8. The IHS of claim 7, wherein the at least one component location indication engine is configured to receive the plurality of component location indication instructions via a network that is coupled to the processing system and from a management system that is located outside of the chassis.

9. The IHS of claim 7, wherein the at least one component location indication engine includes a single component location indication engine that is housed in the chassis and coupled to each of the plurality of components.

10. The IHS of claim 7, wherein the at least one component location indication engine includes a respective component location indication engine that is included in each of the plurality of components.

11. The IHS of claim 9, wherein the at least one component location indication engine is configured to:
identify a respective fault with each of the plurality of components; and
generate, in response to identifying the respective fault with each of the plurality of components, the plurality of location indication instructions.

12. The IHS of claim 7, wherein the unique vibration patterns each include a different number of vibration morse code dots.

13. The IHS of claim 7, wherein at least one of the component vibration devices is provided by at least one of the plurality of components in the chassis that is coupled to the processing system and that is configured to operate to provide at least one component function that is unrelated to component location indication and that is configured to produce the vibration in response to operating.

14. A method for indicating a location of a computing system or computing device using vibrations, comprising:
receiving, by at least one computing component location indication subsystem in a computing system from a management system via a network, a plurality of computing component location indication instructions to indicate a respective location of each of a plurality of computing components included in the computing system; and
driving, by the at least one computing component location indication subsystem based on the plurality of computing component location indication instructions, a respective computing component vibration device included in each of the plurality of computing components to produce a unique vibration pattern for that computing component that is configured to indicate the respective location of that computing component.

15. The method of claim 14, further comprising:
receiving, by a computing system location indication subsystem in the computing system from the management system via the network, a computing system location indication instruction to indicate a location of the computing system; and
driving, by the computing system location indication subsystem based on the computing system location indication instruction, the computing system vibration device to produce a vibration that is configured to indicate the location of the computing system.

16. The method of claim 14, wherein the at least one computing component location indication subsystem includes a single computing component location indication subsystem that is included in the computing system and coupled to each of the plurality of computing components.

17. The method of claim 14, wherein the at least one computing component location indication subsystem includes a respective computing component location indication subsystem that is included in each of the plurality of computing components.

18. The method of claim 14, wherein the unique vibration patterns each include a different number of vibration morse code dots.

19. The method of claim 14, wherein at least one of the computing component vibration devices is provided by at least one of the plurality of computing components in the computing system that is configured to operate to provide at least one computing component function that is unrelated to computing component location indication and that is configured to produce the vibration in response to operating.

20. The method of claim 14, further comprising:
identifying, by the at least one computing component location indication subsystem, a respective fault with each of the plurality of components; and
generating, by the at least one computing component location indication subsystem in response to identifying the respective fault with each of the plurality of components, the plurality of computing component location indication instructions.

* * * * *